July 13, 1926.
A. R. SIEGLER
1,592,051
AIRPLANE
Filed July 6, 1925     3 Sheets-Sheet 1
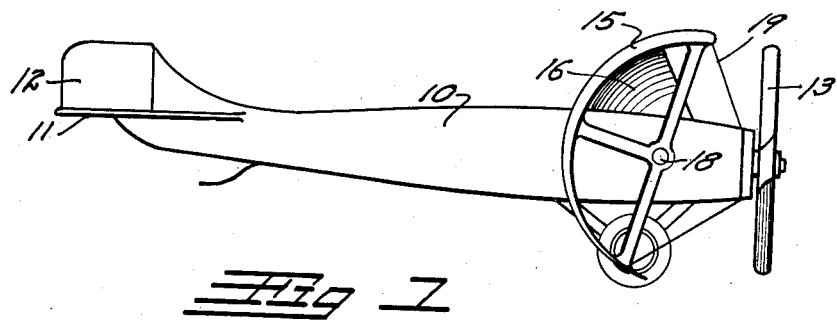
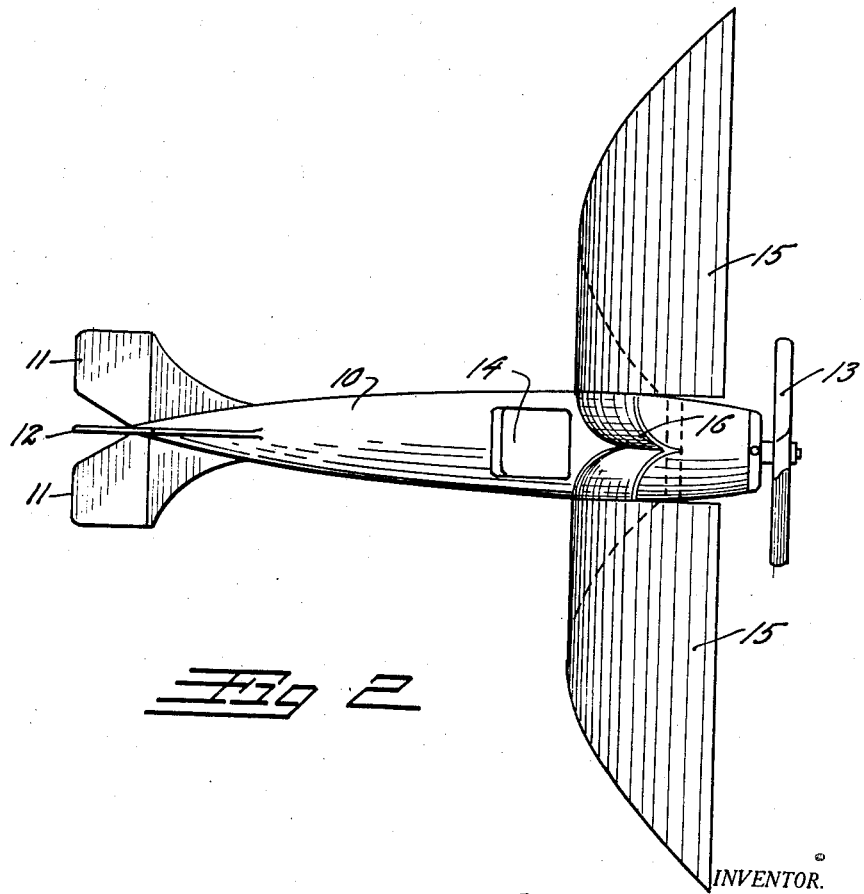
INVENTOR.
ARTHUR R. SIEGLER
BY
ATTORNEY.

July 13, 1926.
A. R. SIEGLER
1,592,051
AIRPLANE
Filed July 6, 1925    3 Sheets-Sheet 2
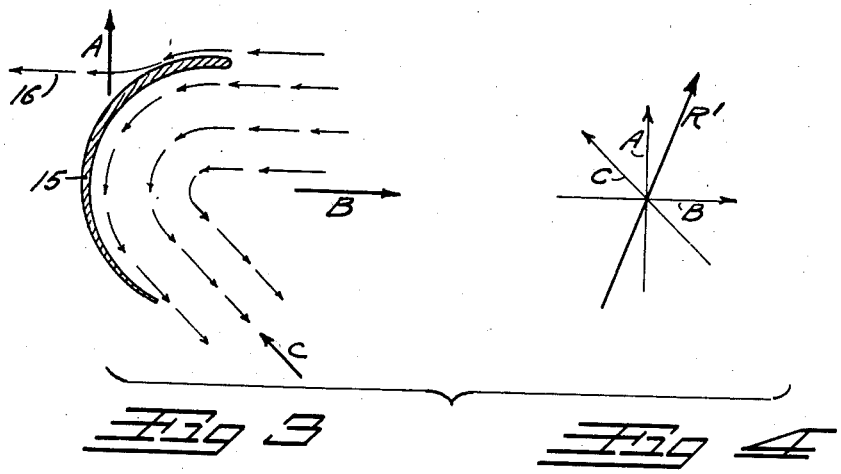
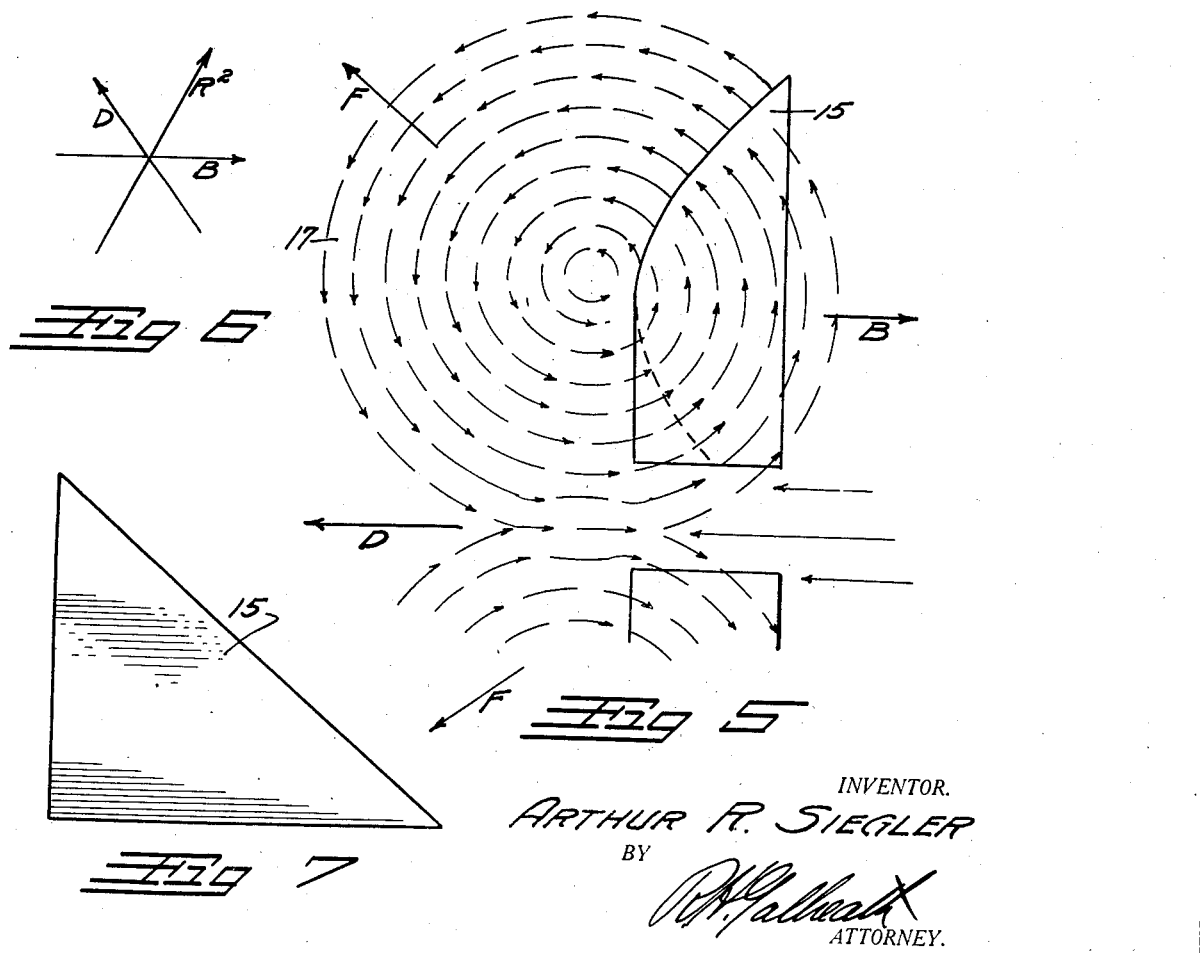
INVENTOR.
ARTHUR R. SIEGLER
BY
ATTORNEY.

July 13, 1926.
A. R. SIEGLER
1,592,051
AIRPLANE
Filed July 6, 1925
3 Sheets-Sheet 3
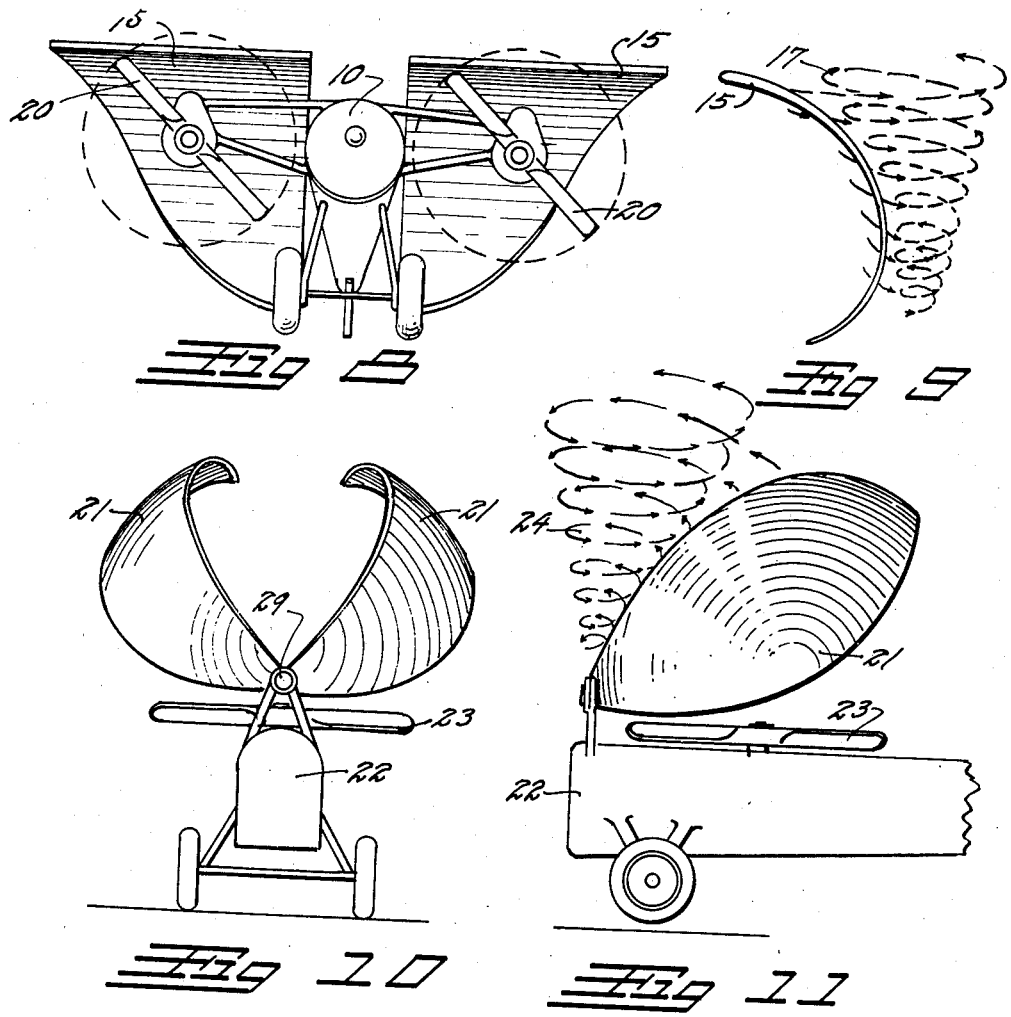
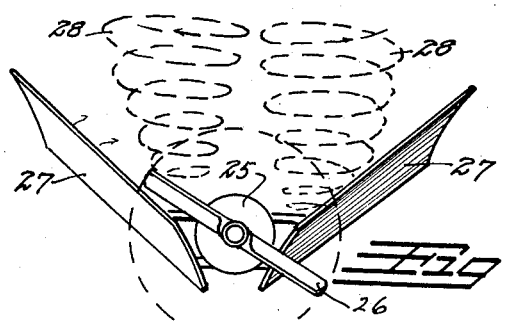
INVENTOR.
ARTHUR R. SIEGLER
BY
ATTORNEY.

Patented July 13, 1926.

1,592,051

UNITED STATES PATENT OFFICE.

ARTHUR R. SIEGLER, OF DENVER, COLORADO.

AIRPLANE.

Application filed July 6, 1925. Serial No. 41,609.

This invention relates to an improvement in the wings of airplanes and has for its principal object the provision of a wing which will exert a substantially vertical lift upon the plane.

Another object is to design a wing which will create a substantially vertical vortex whirl immediately behind and over the wing so as to exert a lifting action thereon.

A further object is to provide a wing for airplanes which can be adjusted for either vertical or horizontal flight.

Other objects lie in the advantages obtained from the use of my improved wing which will become more apparent from the following description.

In the following detailed description of the invention reference is had to the accompanying drawings which form a part hereof. Like numerals refer to like parts in all views of the drawings and throughout the description.

In the drawings:—

Fig. 1 is a side elevation of an airplane in which my improvements have been embodied.

Fig. 2 is a plan view of the same.

Fig. 3 is a diagram illustrating the action of a vertical section of the improved airplane wing.

Fig. 4 is a diagram of the forces at work in Fig. 3.

Fig. 5 is also a diagrammatic view illustrating in plan the action of the wing surfaces.

Fig. 6 is a vertical force diagram illustrating the resultant of the forces of Fig. 4.

Fig. 7 illustrates the development of the wing.

Fig. 8 is a front elevation of a form of the invention in which, the wings are made relatively short and two motors are employed.

Fig. 9 is an end elevation of the wing employed in Fig. 8.

Fig. 10 is a front elevation of an alternate form of the wings.

Fig. 11 is a side view illustrating the action of the wings of Fig. 10.

Fig. 12 is a front view of still another method of accomplishing the objects of the invention.

In the drawings the fuselage of an airplane is illustrated at 10 provided with the usual horizontal rudders 11, vertical rudder 2, propeller 13, and cock-pit 14. Projecting from each side of fuselage 10, are wings 15, of unusual design.

When developed, the wings 15 assume the shape of a right triangle, as illustrated in Fig. 7. On the plane, the shorter side of the triangle is straight and projects at right angles to the axis of the fuselage 10 and the longer side is curved and placed alongside of the fuselage, point downward.

As the draft from the propeller strikes the wings 15, it will be directed downward and outward. The vertical action of the wing is illustrated in Fig. 3, in which, a portion of the propeller blast is turned and directed at a downward and forward angle resulting in a driving force on the wing in the direction of the arrow C. The air passing over the wing, indicated at 16, results in a vacuum or upward suction in the direction of the arrow A. The pull of the propeller is indicated by the arrow B.

The three forces A, B and C when combined, as illustrated in Fig. 4, result in a substantially upward lift on the plane, as indicated by the arrow R'.

As illustrated, it is assumed that the axis of the plane is horizontal. If the plane be tilted upward the resultant arrow R' can be made perpendicular.

In addition to the lift illustrated in Figs. 3 and 4, the triangular shape of the wing causes a vortex whirl to be created at the rear of and over the wing, as illustrated in Figs. 5 and 9. The air being driven against the wing surface by the propeller 13 will travel outward and escape around the outer edge of each wing. Since the outer edges edge of each wing curve inward, the escaping air will be forced into coacting miniature, cyclones or vortex whirls 17, having their vortex smallest diameters downward.

The pull from the vacuum caused by the whirl will draw upon the wing in rearward and upward direction, as indicated by the arrow D, Fig. 6. This pull is opposed by the drag of the propeller (arrow B) and results in a substantially upward lift, as indicated by the arrow $R^2$. The pull can be made directly upward by tilting the nose of plane upward.

To assisst in forcing the air along the wing surface, deflectors 16 may be placed above the fuselage curved to conform to the curvature of the wing and to separate and force the air current along the wing.

The rearward and upward pull of the whirls 17 is assisted by the fact that the draft over and between the wings will tend to bend or force the whirls rearward away from the wings. The vacuum of the whirls, as they are forced away, will pull the wings in the directions indicated by the arrows F, of Fig. 5. The two forces F having a resultant force coinciding with the resultant R² of Fig. 6.

The wings 15 may be pivoted to the fuselage, as indicated at 18 so that the angle of the wings may be adjusted, by means of control wires 19, as desired.

In Fig. 8, the design of the wings has been changed to increase the velocity of the whirl. In this design, the wings are relatively short and each is placed immediately behind an independent propeller 20.

This design results in a much greater velocity being imparted to the air escaping around the outer wing edge and a greater lifting power in the whirls 17. The wing in this design is more gradually curved and when not desired for vertical lifting may be turned, at the pivots 18, to serve for horizontal flying.

In Figs. 10 and 11, I have illustrated wings 21 which are curved both backward and sideward—they may, in fact, be semi-spherical in shape. In Fig. 10, the fuselage is indicated at 22 and the propeller at 23.

With this form of wing I prefer to place the propeller horizontal so that it will direct its air upward against the wings 21. The blast will emerge along the curved, inclined inner edges of the wings and be forced into two coacting vortex whirls 24 having their vortexes or smaller diameters downward. The vacuum caused by the whirls will exert a vertical lifting action upon the wings tending to raise the plane. The wings 21 may be hinged at 29 if desired so their spacing and incident angle may be adjusted.

In Fig. 12, another method of obtaining vortex whirls is illustrated. In this method, wings 27 similar to those at present in use upon airplanes, are employed. The wings 27 are, however, placed so that their axis will extend a relatively sharp rearward and upward angle with their surfaces turned to force the blast at a downward angle. The angularly placed rearward edges causes the passing air to form in a vortex whirl as in the preceding forms.

While I have described and illustrated herein, specific forms of my invention, I desire to be understood that the same may be varied, limited only by the scope of the appended claims in which it is my intention to claim all novelty inherent in my invention and permissible over the prior art. My invention does not, of course, depend upon the accuracy of the theories of its operation which I have advanced.

Having thus described my invention, what I claim and desire secured by Letters Patent is:—

1. In an airplane comprising a fuselage; semi-cylindrical wings extending in alignment from opposite sides of said fuselage substantially at 90° thereto, the concave side of said wings facing toward the front of said airplane.

2. In an airplane comprising a fuselage; semi-cylindrical wings extending in alignment from opposite sides of said fuselage substantially at 90° thereto, the concave side of said wings facing toward the front of said airplane; and semi-spherical surfaces carried by said fuselage in alignment with said wings so as to direct air parallel to the surfaces thereof.

3. In an airplane comprising a fuselage; right triangular wings mounted on said fuselage, one leg of said triangle being curved in a single continuous curve and placed adjacent and in a vertical plane parallel to the axis of said fuselage, the base of said triangle being straight and extending at right angles to the axis of said fuselage.

4. In an airplane comprising a fuselage; right triangular wings mounted on said fuselage, one leg of said triangle being curved in a single continuous curve and placed adjacent and in a vertical plane parallel to the axis of said fuselage, the base of said triangle being straight and extending at right angles to the axis of said fuselage, said base being substantially above said axis and the apex of said triangle being substantially below said axis.

In testimony whereof, I affix my signature.

ARTHUR R. SIEGLER.